United States Patent
Yang (10) Patent No.: US 12,035,354 B2
(45) Date of Patent: Jul. 9, 2024

(54) METHOD FOR PROCESSING DATA, COMMUNICATION DEVICE AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 122 days.

(21) Appl. No.: 17/635,272

(22) PCT Filed: Aug. 16, 2019

(86) PCT No.: PCT/CN2019/101135
§ 371 (c)(1),
(2) Date: Feb. 14, 2022

(87) PCT Pub. No.: WO2021/030979
PCT Pub. Date: Feb. 25, 2021

(65) Prior Publication Data
US 2022/0295512 A1  Sep. 15, 2022

(51) Int. Cl.
*H04W 72/566* (2023.01)
*H04W 72/1268* (2023.01)

(52) U.S. Cl.
CPC ..... *H04W 72/566* (2023.01); *H04W 72/1268* (2013.01)

(58) Field of Classification Search
CPC ........... H04W 72/566; H04W 72/1268; H04W 72/23; H04W 72/56; H04W 72/21; H04W 76/14; H04W 92/18; H04W 72/563
See application file for complete search history.

(56) References Cited

U.S. PATENT DOCUMENTS

| 2016/0219640 | A1* | 7/2016 | Jung ..................... H04W 76/14 |
| 2016/0381595 | A1* | 12/2016 | Lee ........................ H04W 72/21 |
| | | | 370/329 |
| 2019/0253977 | A1 | 8/2019 | Wang et al. |
| 2021/0029723 | A1* | 1/2021 | Wu ..................... H04W 72/569 |
| 2022/0264590 | A1* | 8/2022 | Han ..................... H04L 1/1854 |

FOREIGN PATENT DOCUMENTS

| CN | 107666647 A | 2/2018 |
| EP | 3291626 A1 | 3/2018 |

OTHER PUBLICATIONS

PCT/CN2019/101135 International Search Report, dated May 20, 2020, 2 pages.
European Patent Application No. 19942533.1, Search and Opinion dated Jul. 25, 2022, 10 pages.
Indian Patent Application No. 202247013841, Office Action dated Jul. 26, 2022, 7 pages.

* cited by examiner

*Primary Examiner* — Dinh Nguyen
(74) *Attorney, Agent, or Firm* — Cozen O'Connor (57) ABSTRACT

A method for processing data, includes: transmitting a priority of a Uu logic channel for Uu data, in which, the priority of the Uu logic channel for the Uu data and a priority of sidelink data are jointly configured to, in response to a transmission conflict between the Uu data and the sidelink data, select data with a higher priority from the Uu data and the sidelink data for preferential transmission; and there are at least two priorities for the sidelink data.

19 Claims, 6 Drawing Sheets

METHOD FOR PROCESSING DATA, COMMUNICATION DEVICE AND STORAGE MEDIUM

CROSS-REFERENCE TO RELATED APPLICATION

This application is a national phase of International Application No. PCT/CN2019/101135, filed on Aug. 16, 2019, the entire content of which is incorporated herein by reference.

TECHNICAL FIELD

Embodiments of the disclosure relate to the field of wireless communication, and more particularly to a method for processing data, a communication device and a storage medium.

BACKGROUND

A sidelink communication manner is introduced to support sidelink communication among terminals (or user equipments, UE).

The sidelink communication and the mobile communication multiplex an uplink transmission resource of a Uu logic channel. The mobile communication includes communication between a terminal and a base station.

When the sidelink communication multiplexes the uplink transmission resource of the Uu logical channel, a transmission conflict using the uplink transmission resource of the Uu logic channel exists.

SUMMARY

According to a first aspect of embodiments of the disclosure, a method for processing data is provided, and includes: transmitting a priority of a Uu logic channel for Uu data, in which the priority of the Uu logic channel for Uu data and a priority of sidelink data are jointly configured to, in response to a transmission conflict between the Uu data and the sidelink data, select data with a higher priority from the Uu data and the sidelink data for preferential transmission; and there are at least two priorities for the sidelink data.

According to a second aspect of embodiments of the disclosure, a method for processing data is provided, and includes: receiving a priority of a Uu logic channel for Uu data, in which the priority of the Uu logic channel for Uu data and a priority of sidelink data are jointly configured to, in response to a transmission conflict between the Uu data and the sidelink data, select data with a higher priority from the Uu data and the sidelink data for preferential transmission; and there are at least two priorities for the sidelink data.

According to a third aspect of embodiments of the disclosure, a communication device is provided, and includes: a transceiver; a memory; and a processor, connected to the transceiver and the memory, configured to control the transceiver to transmit and receive wireless signals by performing computer executable instructions stored on the memory, and perform any method for processing data as described in the first aspect or the second aspect.

According to a fourth aspect of embodiments of the disclosure, a computer storage medium stored with computer executable instructions is provided, in which the computer executable instructions are caused to perform any method for processing data as described in the first aspect or the second aspect when performed by a processor.

DETAILED DESCRIPTION

The network architecture and service scenario described in embodiments of the disclosure are intended to explain the technical solutions of embodiments of the disclosure more clearly, and do not constitute a limitation to the technical solutions provided in embodiments of the disclosure. The person of ordinary skill in the art knows that the technical solutions provided in embodiments of the disclosure are equally applied to similar technical issues as the network architecture and new service scenarios advance.

Figure 1:
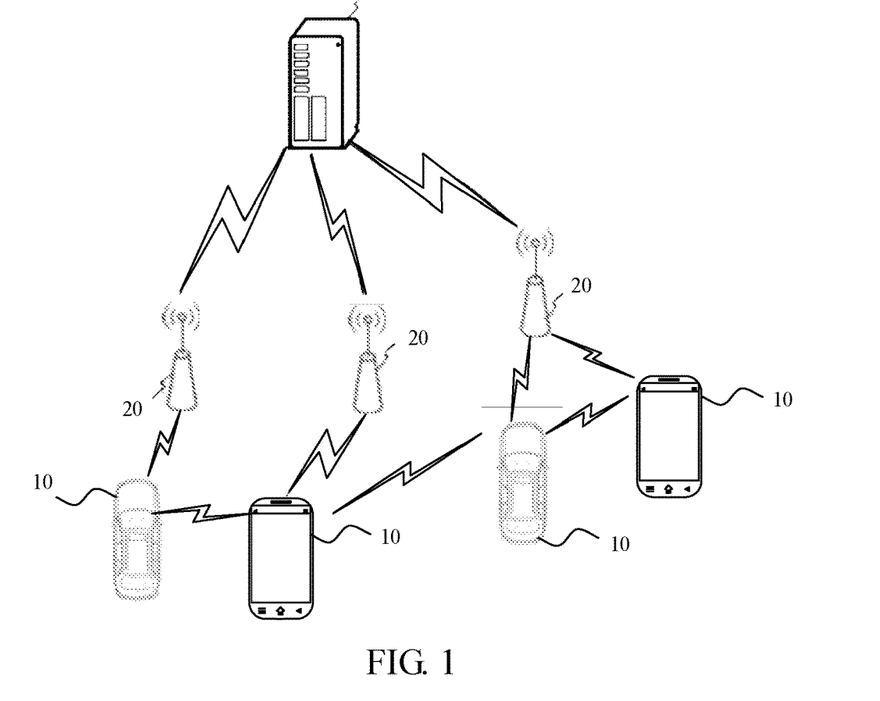
FIG. 1 is a diagram illustrating a structure of a wireless communication system according to embodiments of the disclosure.

Referring to FIG. 1, a diagram illustrating a structure of a wireless communication system according to embodiments of the disclosure is shown. As illustrated in FIG. 1, a wireless communication system is based on a cellular mobile communication technology. The wireless communication system includes several terminals 10 and several base stations 20.

The terminal 10 may refer to a device that provides voice and/or data connectivity for a user. The terminal 10 may communicate with one or more core networks through a radio access network (RAN). The terminal 10 may be an Internet of Things terminal, such as a sensor device, a mobile phone (or a "cellular" phone) and a computer having an Internet of Things terminal, for example, a fixed, portable, pocket-sized, handheld, computer built-in or vehicle-mounted device. For example, it may be a station (STA), a subscriber unit, a subscriber station, a mobile station, a mobile, a remote station, an access point, a remote terminal, an access terminal, a user terminal, a user agent, a user device or a user equipment (UE). Alternatively, the terminal 10 may also be a device of an unmanned aerial vehicle. Alternatively, the terminal 10 may be a vehicle-mounted device, for example, a vehicle computer with a wireless communication function or a wireless communication device externally connected to a vehicle computer. Alternatively, the terminal 10 may be a roadside device, for example, a street lamp, a signal lamp or other roadside device with a wireless communication function.

The base station 20 may be a network side device in the wireless communication system. The wireless communication system may be the 4$^{th}$ generation mobile communication (4G) system, also known as the Long Term Evolution (LTE) system; or, the wireless communication system may be the 5$^{th}$ generation mobile communication (5G) system, also known as the new radio (NR) system or the 5G NR system. Alternatively, the wireless communication system may be the next generation system following the 5G system. The access network in the 5G NR system may be referred to as the new generation-radio access network (NG-RAN).

The base station 20 may be an evolved node base station (eNB) used in the 4G system. Alternatively, the base station 20 may also be a next generation node base station (gNB) adopting a centralized and distributed architecture in the 5G system. When the base station 20 adopts the centralized and distributed architecture, it usually includes a central unit (CU) and at least two distributed units (DUs). The central unit is provided with a protocol stack of a Packet Data Convergence Protocol (PDCP) layer, a Radio Link Control (RLC) layer and a Media Access Control (MAC) layer. The distributed unit is provided with a protocol stack of a Physical (PHY) layer. Embodiments of the disclosure may not limit the implementation manner of the base station 20.

A wireless connection may be established between the base station 20 and the terminal 10 through a wireless air interface. In different embodiments, the wireless air interface may be a wireless air interface based on the 4G standard; or, the wireless air interface may be a wireless air interface based on the 5G standard, such as the wireless air interface is a new air interface; or the wireless air interface may be a wireless air interface based on the next generation mobile communication network technology standard following the 5G standard.

In some embodiments, an end to end (E2E) connection may be established between the terminals 10. For example, vehicle to vehicle (V2V) communication, vehicle to infrastructure (V2I) communication and vehicle to pedestrian (V2P) communication in vehicle to everything (V2X) communications.

In some embodiments, the wireless communication system may further include a network management device 13.

Several base stations 20 are connected to the network management device 13 respectively. The network management device 13 may be a core network device in the wireless communications system, for example, the network management device 13 may be a mobility management entity (MME) in an evolved packet core (EPC). Alternatively, the network management device may be other core network devices, for example, a Serving Gateway (SGW), a Public Data Network Gateway (PGW), a Policy and Charging Rules Function (PCRF) or a Home Subscriber Server (HSS). The implementation of the network management device 13 is not limited in the embodiment of the disclosure.

Figure 2:
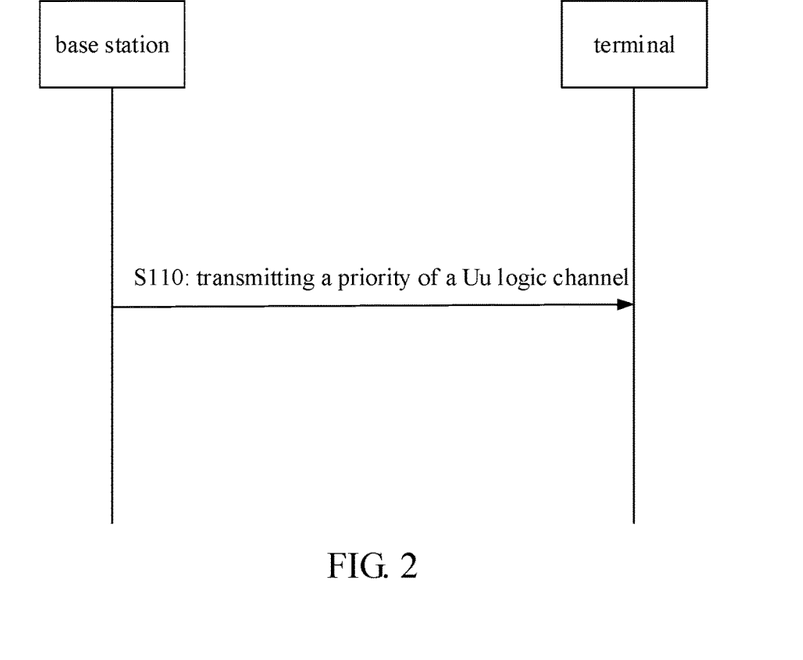
FIG. 2 is a flowchart illustrating a method for transmitting data according to embodiments of the disclosure.

As illustrated in FIG. 2, a method for processing data is provided in the embodiments and includes S110.

At S110, a priority of a Uu logic channel for Uu data is transmitted, in which the priority of the Uu logic channel for Uu data and a priority of sidelink data are jointly configured to, in response to a transmission conflict between the Uu data and the sidelink data, select data with a higher priority from the Uu data and the sidelink data for preferential transmission; and there are at least two priorities for the sidelink data.

The embodiments may be applicable to the base station. The base station configures the priority of the Uu logic channel. The priority of the Uu logic channel may be a priority that may be compared with the priority of the sidelink data.

In the embodiments, the Uu logic channel is a channel configured to transmit the Uu data and includes a physical layer (L1), a data link layer (L2) and a network layer (L3). The data link layer includes a medium access control (MAC) layer, a radio link control layer (RLC), etc. The L3 layer may include a control plane and a user plane. The user plane is configured to transmit user data. The control plane is configured to transmit control signalings.

In the embodiments of the disclosure, the Uu data is a channel for transmission by the Uu logic channel.

In the wireless communication system, there are a plurality of types of Uu logic channels or a plurality of Uu logic channels. Different Uu logic channels may be configured to transmit different Uu data. In this way, the priority of the Uu logic channel may be represented as the priority of the Uu logic channel for the Uu data.

For example, the Uu data may be classified into a MAC protocol data unit PDU) of urgent Uu data and a MAC PDU of common Uu data. The urgent Uu data are mapped to a Uu logic channel with a higher priority for transmission, and the common Uu data are mapped to a Uu logic channel with a lower priority for transmission.

The sidelink data is data for transmission by sidelink. The sidelink data may be data transmitted between terminals.

Figure 3:
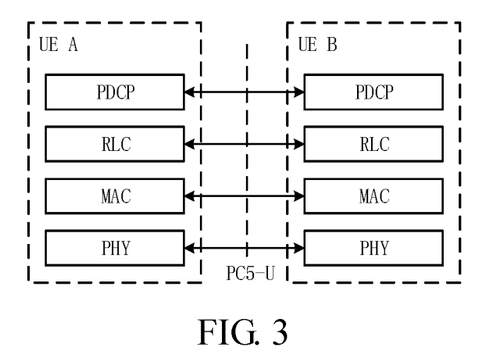
FIG. 3 is a diagram illustrating a PC5-U interface according to embodiments of the disclosure.

FIG. 3 is a diagram illustrating a PC5-U interface for terminals (also referred to as user equipments (UEs)) according to embodiments of the disclosure. The sidelink data may be data transmitted and received by the PC5-U.

The sidelink between a UE A and a UE B includes a physical (PHY) layer connection, a media access control (MAC) layer connection, a radio logic control (RLC) layer and a packet data convergence protocol (PDCP) layer.

Scheduling of a transmission resource of the sidelink data may adopt at least one of the following ways.

One is a network-side dynamic scheduling, for example, a network-side device such as the base station, dynamically allocates the transmission resource of the sidelink data to the terminal based on cache data condition information reported by the terminal.

The other is that the terminal autonomously selects from a resource pool configured by the network-side device to transmit the sidelink data. In this case, the selected transmission resource of the sidelink data may conflict with the transmission resource of the Uu data. For example, the network-side device such as the base station may configure the resource pool configured for the sidelink for the terminal by a broadcast system message or a dedicated signaling. For example, a resource configuration of the resource pool of the sidelink is carried in a system information block (SIB).

In response to the transmission conflict between the Uu data and the sidelink data, it may be selected to be transmitted based on the priority of the Uu logic channel and the priority of the sidelink data. The higher the priority, the higher the transmission urgency degree or the higher the data importance. In response to the conflict, the data with the higher priority is selected for preferential transmission, which may satisfy preferential transmission of the data with the higher priority, thereby ensuring the transmission quality of data.

Further, in embodiments of the disclosure, there are at least two priorities for the sidelink data, which specifically may be 3, 4, etc. In this way, the priority of the sidelink data is no longer a unified one.

In some embodiments, priorities of different types of sidelink data are different. For example, the sidelink data may include ultra reliable low latency communications (URLLC) data and enhance mobile broadband (eMBB) data. The priorities of the URLLC data and the eMBB data are different.

The transmission urgency degrees and importance degrees of different types of sidelink data are different, so that different priorities are configured for different types of sidelink data, and the sidelink data is no longer compared with the Uu data as a whole on the priorities, so as to obtain a more accurate priority ranking. In response to the transmission conflict between the Uu data and the sidelink data, the most urgent and most important data are selected for preferential transmission based on the more accurate priority ranking, thereby improving the QoS of data transmission as a whole.

For another example, priorities of data content of different sidelink data are different, for example, the priority of security data related to a security issue is higher than the priority of communication data related to communication interaction between devices. For example, sidelink data A and sidelink data B belong to URLLC data. However, the sidelink data A is data related to driving security of a vehicle-mounted device, and the sidelink data B is communication data between vehicle-mounted devices. In this case, the priority of the sidelink data A may be configured to be higher than the priority of the sidelink data B.

In summary, in embodiments of the disclosure, compared with the priority of the Uu data, there is no longer a single priority for sidelink data, and there are at least two priorities for sidelink data. In this way, the priorities of the sidelink data may be distinguished based on the importance degree and the urgency degree. When the Uu data and the sidelink data are reselected to be transmitted based on the comparison of the priorities, the current more important and more urgent data may be selected to be transmitted, which improves the QoS of transmitting sidelink data.

In some embodiments, the priority of the sidelink data includes: a priority of a proximity service quality indication (PQI) of the sidelink data.

The higher the priority of the PQI, the higher the transmission urgency degree and importance degree of the sidelink data. Therefore, the priority of the PQI of the sidelink data may be multiplexed in embodiments of the disclosure to be compared with the priority of the Uu logic channel configured for the Uu data and there is no need to configure the priority of the sidelink data, so as to be compatible with the related art and simplify the manner for selecting data for transmission.

In some embodiments, the base station also may transmit priorities of different sidelink data. In response to the transmission conflict between the Uu data and the sidelink data, the terminal may select the data with the higher priority from the Uu data and the sidelink data for preferential transmission, based on the priority of the Uu logic channel and the priority of the sidelink data, transmitted by the base station.

In some embodiments, the transmission conflict includes: a transmission power conflict of simultaneously transmitting the Uu data and the sidelink data; or a time-frequency resource conflict of simultaneously transmitting the Uu data and the sidelink data.

For example, the Uu data and the sidelink data need to be transmitted simultaneously. However, the transmission power of the terminal is limited and is only capable of supporting transmission of one type of data. In this case, the transmission power conflict may exist.

It is assumed that the sum of minimum transmission powers of the Uu data and the sidelink data is greater than a maximum transmission power supported by the terminal. In this case, if the transmission power is averaged, the Uu data and the sidelink data may fail to be transmitted simultaneously, and if the transmission power of one type of data is ensured, the transmission power of the other type of data is less than the minimum transmission power, resulting in a failure of such the other type of data transmission. Therefore, the transmission power conflict may result in failing to transmit at least one type of data while transmitting two types of data simultaneously.

If the Uu data and the sidelink data use the same time-frequency resource, simultaneous transmission may cause interference, and mutual interference at least may result in failing to transmit one type of data.

Therefore, in the embodiments of the disclosure, in response to the transmission conflict between the Uu data and the sidelink data, the priority of the Uu logic channel is compared with the priority of the sidelink data, to select the Uu data or the sidelink data with the higher priority for transmission, to ensure a transmission success rate of data.

In response to no transmission conflict between the Uu data and the sidelink data, the terminal may transmit the Uu data and/or sidelink data required to be transmitted without necessarily comparing the priorities and selecting data for transmission.

Figure 4:
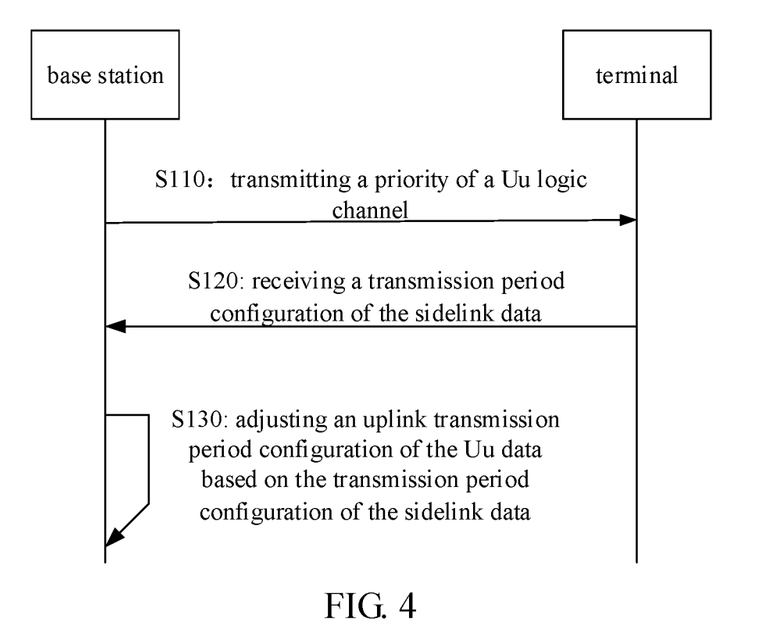
FIG. 4 is a flowchart illustrating another method for transmitting data according to embodiments of the disclosure.

In some embodiments, as illustrated in FIG. 4, the method further includes the following.

At S120, a transmission period configuration of the sidelink data is received, in which the transmission period configuration of the sidelink data is reported in response to the transmission conflict between the Uu data and the sidelink data and in response to an uplink transmission period of the Uu data and a transmission period of the sidelink data satisfying a predetermined condition.

At S130, an uplink transmission period configuration of the Uu data is adjusted based on the transmission period configuration of the sidelink data.

In the embodiments of the disclosure, in response to the transmission conflict between the Uu data and the sidelink data, for the terminal, it is found that the Uu data and the sidelink data are transmitted periodically, and the uplink transmission period of the Uu data is at least partially overlapped with the transmission period of the sidelink data, which may be deemed satisfying the predetermined condition. Further, the uplink transmission period of the Uu data is completely consistent with the transmission period of the sidelink data, it is obvious that there is the transmission conflict.

In this case, the terminal may report the transmission period configuration of the sidelink data to the base station, so that the base station determines whether to adjust the uplink transmission period of the Uu data, to reduce the transmission conflict between the Uu data and the sidelink data.

In some embodiments, in order to facilitate the base station to acquire more comprehensive information, in response to the transmission conflict and satisfying the predetermined condition, the transmission period configuration of the sidelink link data is reported.

In some embodiments, the uplink transmission period configuration of the Uu data is adjusted based on the transmission period configuration of the sidelink data in response to the priority of the sidelink data being higher than the priority of the Uu logic channel for the Uu data.

That is, the base station may receive the transmission period configuration of the sidelink data from the terminal when the Uu data needs to back off the sidelink data, between which the transmission conflict exists, so that the base station adjusts the uplink transmission period configuration of the Uu data based on the transmission period configuration of the sidelink data.

In response to the uplink transmission period configuration of the Uu data changing, the transmission conflict between the Uu data and the sidelink data may be reduced or avoided, so as to improve the transmission quality of the Uu data and/or the sidelink data.

The transmission period configuration of the sidelink data may be any information indicating that the sidelink data is periodically transmitted in a time domain. For example, a duration of a transmission period of the sidelink data, a start position and an end position of each transmission period. For another example, the number of subframes, a subframe position and a duration of a single subframe contained in the transmission period of the sidelink data.

In some embodiments, adjusting the uplink transmission period configuration of the Uu data based on the transmission period configuration of the sidelink data, includes: adjusting, based on the transmission period configuration of the sidelink data, at least one of the following in the uplink transmission period configuration of the Uu data: a start subframe position of the uplink transmission period of the Uu data; a subframe duration of a subframe contained in the uplink transmission period of the Uu data; and a period duration of the uplink transmission period of the Uu data.

The time-domain resources occupied by the uplink transmission period of the Uu data and the transmission period of the sidelink data are staggered by adjusting the start subframe position, thereby reducing the transmission conflict.

The number of subframes contained in the uplink transmission period remains unchanged, decreases or slightly increases by adjusting the subframe duration, to ensure that the uplink transmission period of the Uu data and the transmission period of the sidelink data are staggered, thereby reducing the transmission conflict.

In some embodiments, the overlap of the uplink transmission period of the Uu data and the transmission period of the sidelink data may be decreased or avoided by directly adjusting the period duration of the Uu data, thereby reducing the transmission conflict.

In embodiments of the disclosure, the uplink transmission period configuration of the Uu data is adjusted in response to the priority of the Uu logic channel for the Uu data being lower than the priority of the sidelink data.

In some embodiments, the uplink transmission period of the Uu data has at least two alternative uplink period configurations. For example, Table 1 is the uplink transmission period configuration of the Uu data.

The terminal may transmit the transmission period configuration of the sidelink data to the base station in response to the transmission conflict between the Uu data and the sidelink data and in response to the uplink transmission periods of both data satisfying the predetermined condition.

TABLE 1

| Serial number of uplink transmission period configurations | start subframe | duration (ms) | period (ms) |
|---|---|---|---|
| 1 | 0 | 1 | 10 |
| 2 | 5 | 2 | 20 |

In response to determining that the current valid uplink transmission period with the serial number 1 and the transmission period of the sidelink data satisfies the predetermined condition based on the transmission period configuration of the sidelink data received, the uplink transmission period with the serial number 2 may be validated, thereby achieving an adjustment of the uplink transmission period configuration of the Uu data.

Therefore, in some embodiments, the method may include: generating one or more alternative uplink transmission period configurations of the Uu data based on resource scheduling; and selecting a target uplink transmission period configuration from the one or more alternative uplink transmission period configurations, thereby determining the uplink transmission period of the Uu data.

The one or more alternative uplink transmission period configurations include: a first configuration and a second configuration. The first configuration includes a first start position of a start subframe, a first duration of a subframe and a first transmission period; and the second configuration includes a second start position of a start subframe, a second duration of a subframe and a second transmission period.

The first configuration and the second configuration include at least one of the following: the first start position being different from the second start position; the first duration being different from the second duration; or the duration of the first transmission period being different from the duration of the second transmission period.

In response to adjusting the uplink transmission period configuration of the Uu data, the method may include: in response to the current valid first configuration, invalidating the first configuration and validating the second configuration; and in response to the current valid second configuration, invalidating the second configuration and validating the first configuration.

In some embodiments, the method further includes: transmitting the adjusted uplink transmission period configuration of the Uu data.

In response to the uplink transmission period configuration of the Uu data changing, the adjusted uplink transmission period configuration of the Uu data needs to be retransmitted, so that the terminal knows when to transmit the Uu data.

For example, the adjusted uplink transmission period configuration of the Uu data may be transmitted based on broadcast transmission, multicast transmission or dedicated broadcast transmission.

In some embodiments, the method further includes: receiving the PQI of the sidelink data while receiving the transmission period configuration of the sidelink data.

For the terminal, the transmission period configuration of the sidelink data may be transmitted while the PQI of the sidelink data may be transmitted in response to the transmission conflict between the Uu data and the sidelink data and in response to the transmission periods of both data satisfying the predetermined condition. The PQI is correlated to the priority, the transmission urgency degree and the importance degree of the sidelink data. The base station may further decide whether to adjust the uplink transmission configuration of the Uu data or adjust the uplink transmission configuration of which Uu data based on the PQI.

Figure 5:
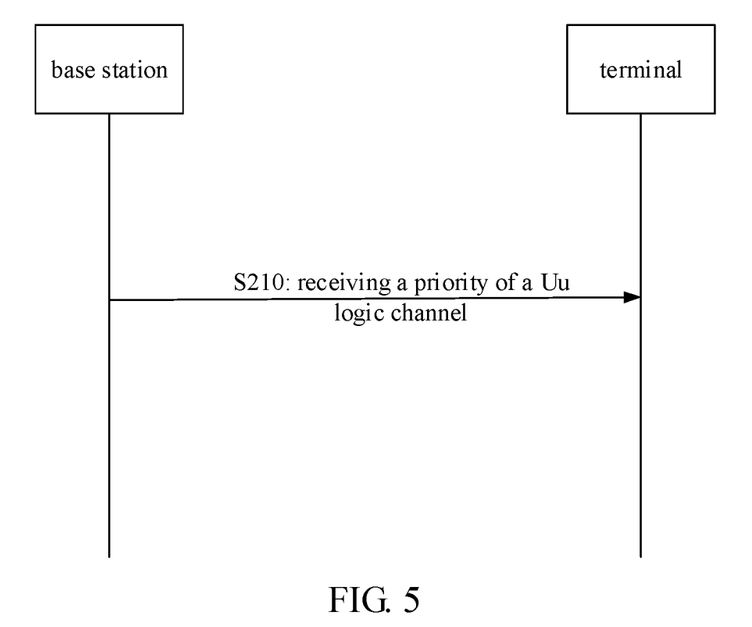
FIG. 5 is a flowchart illustrating another method for transmitting data according to embodiments of the disclosure.

As illustrated in FIG. 5, a method for processing data is provided in the embodiments and includes S210.

At S210, a priority of a Uu logic channel for Uu data is received; in which the priority of the Uu logic channel for Uu data and a priority of sidelink data are jointly configured to, in response to a transmission conflict between the Uu data and the sidelink data, select data with a higher priority from the Uu data and the sidelink data for preferential transmission; and there are at least two priorities for the sidelink data.

The method provided in embodiments of the disclosure may be applicable to a terminal device. The terminal device may include a fixed terminal and/or a mobile terminal. The mobile terminal may include a human-mounted terminal or a vehicle-mounted terminal. The fixed terminal may include an internet of things (IoT) device, etc.

Figure 6:
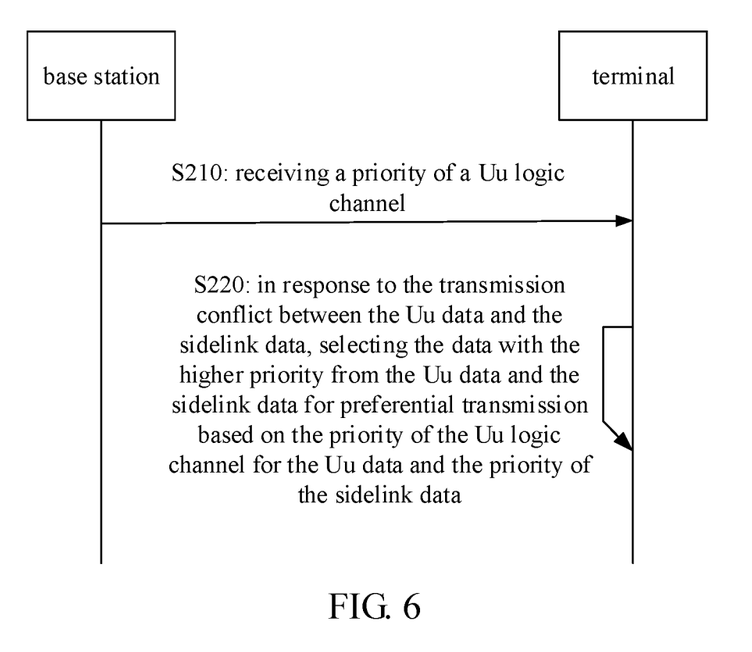
FIG. 6 is a flowchart illustrating another method for transmitting data according to embodiments of the disclosure.

In some embodiments of the disclosure, as illustrated in FIG. 6, the method further includes S220.

At S220, in response to the transmission conflict between the Uu data and the sidelink data, the data with the higher priority is selected from the Uu data and the sidelink data for preferential transmission based on the priority of the Uu logic channel for the Uu data and the priority of the sidelink data.

The transmission conflict herein may be a transmission power conflict of simultaneously transmitting the Uu data and the sidelink data, and/or, a time-frequency resource conflict of simultaneously transmitting the Uu data and the sidelink data.

In response to the transmission conflict, the terminal may compare the priority of the Uu logic channel for the Uu data with the priority of the sidelink data, and select the Uu data or the Uu data with the higher priority for preferential transmission, and continue to transmit another data that has not been transmitted in response to no transmission conflict after transmitting the data with the higher priority.

Figure 7:
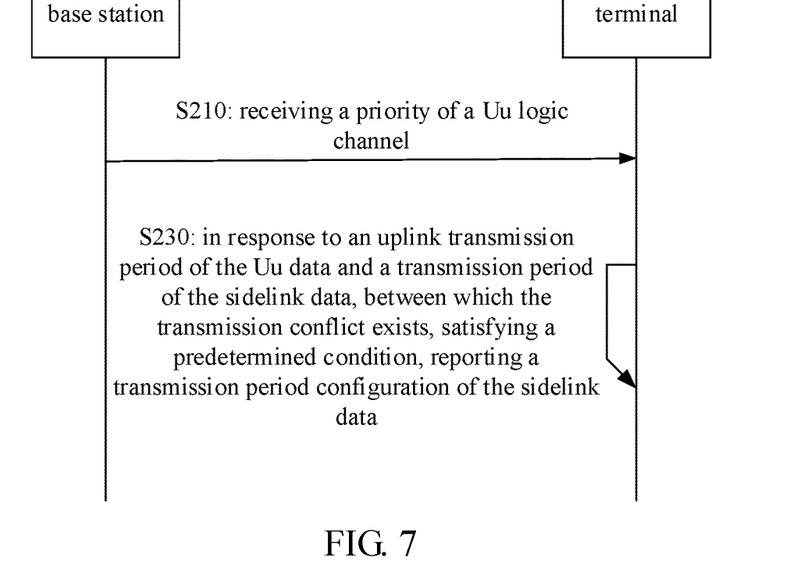
FIG. 7 is a flowchart illustrating another method for transmitting data according to embodiments of the disclosure.

In some embodiments of the disclosure, as illustrated in FIG. 7, the method further includes S230.

At S230, a transmission period configuration of the sidelink data is reported, in response to an uplink transmission period of the Uu data and a transmission period of the sidelink data, between which the transmission conflict exists, satisfying a predetermined condition, in which the transmission period configuration of the sidelink data is configured to trigger an adjustment of an uplink transmission period configuration of the Uu data.

In the embodiments, the uplink transmission period of the Uu data and transmission period of the sidelink data, between which the transmission conflict exists, satisfying the predetermined condition, may include: the uplink transmission period of the Uu data being partially overlapped with the transmission period of the sidelink data in a time domain; the uplink transmission period of the Uu data being consistent with the transmission period of the sidelink data; in the time domain, the uplink transmission period of the Uu data being in the transmission period of the sidelink data; or in the time domain, the uplink transmission period of the Uu data including the transmission period of the sidelink data.

When any above situation exists, it may be deemed that the transmission conflict between the Uu data and the sidelink data exists.

In some embodiments, the method further includes: transmitting a PQI of the sidelink data while transmitting the transmission period configuration of the sidelink data.

The PQI may be configured to determine whether to adjust an uplink transmission period configuration of the Uu data for the base station or adjust the uplink transmission period configuration of which Uu data. In summary, in the embodiments, the PQI is configured to determine whether to adjust the uplink transmission period configuration of the Uu data.

In some embodiments, the method further includes: receiving the adjusted uplink transmission period configuration of the Uu data.

In some embodiments, when the terminal reports the transmission period configuration of the sidelink data and the base station receives the transmission period configuration of the sidelink data, the uplink transmission period configuration of the Uu data may be adjusted. In this way, the terminal may receive the adjusted uplink transmission period configuration of the Uu data from the base station. Priorities of different types of sidelink data are different.

In some embodiments, the method further includes the following. The transmission period configuration of the sidelink data is adjusted in response to the uplink transmission period of the Uu data and the transmission period of the sidelink data, between which the transmission conflict exists, satisfying the predetermined condition, and in response to the priority of the sidelink data being not higher than the priority of the Uu logic channel for the Uu data.

The terminal automatically adjusts the transmission period configuration of the sidelink data in response to the uplink transmission period of the Uu data and the transmission period of the sidelink data, between which the transmission conflict exists, satisfying the predetermined condition, and in response to the priority of the sidelink data being equal to or lower than the priority of the Uu logic channel for the Uu data, so that the transmission conflict between the Uu data and the sidelink data may be reduced.

Figure 8:
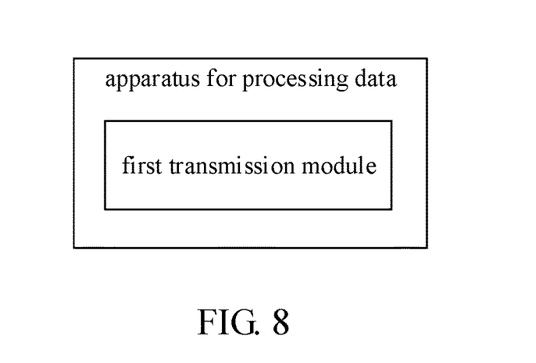
FIG. 8 is a block diagram illustrating an apparatus for processing data according to embodiments of the disclosure.

As illustrated in FIG. 8, an apparatus for processing data is provided in the embodiments and includes a first transmission module.

The first transmission module is configured to transmit a priority of a Uu logic channel for Uu data, in which the priority of the Uu logic channel for Uu data and a priority of sidelink data are jointly configured to, in response to a transmission conflict between the Uu data and the sidelink data, select data with a higher priority from the Uu data and the sidelink data for preferential transmission; and there are at least two priorities for the sidelink data.

In some embodiments, the first transmission module may be a program module, and the program module may implement transmitting the priority of the Uu logic channel when performed by a processor.

In some embodiments, the first transmission module may be a software-hardware combination module, and the software-hardware combination module may include various programmable arrays; the programmable array includes but is not limited to a complex programmable array or a field programmable gate array.

In some embodiments, the first transmission module may include a pure hardware module, and the pure hardware module may include various application-specific integrated circuits.

In some embodiments, the priority of the sidelink data includes: a priority of a PQI of the sidelink data.

In some embodiments, the transmission conflict includes: a transmission power conflict of simultaneously transmitting the Uu data and the sidelink data; or a time-frequency resource conflict of simultaneously transmitting the Uu data and the sidelink data.

In one embodiment, the apparatus further includes: a first receiving module and a first adjusting module.

The first receiving module is configured to receive a transmission period configuration of the sidelink data, in which the transmission period configuration of the sidelink data is reported in response to the transmission conflict between the Uu data and the sidelink data and in response to an uplink transmission period of the Uu data and a transmission period of the sidelink data satisfying a predetermined condition; and the first adjusting module is configured to adjust an uplink transmission period configuration of the Uu data based on the transmission period configuration of the sidelink data.

In some embodiments, the first adjusting module, is configured to, adjust the uplink transmission period configuration of the Uu data based on the transmission period configuration of the sidelink data in response to the priority of the sidelink data being higher than the priority of the Uu logic channel for the Uu data.

In some embodiments, the first receiving module, is further configured to receive the PQI of the sidelink data while receiving the transmission period configuration of the sidelink data, in which the PQI of the sidelink data is configured to determine whether to adjust an uplink transmission configuration of the Uu data.

In some embodiments, the first adjusting module is configured to, based on the transmission period configuration of the sidelink data, adjust at least one of the following in the uplink transmission period configuration of the Uu data: a start subframe position of the uplink transmission period of the Uu data; a subframe duration of a subframe contained in the uplink transmission period of the Uu data; and a period duration of the uplink transmission period of the Uu data.

In some embodiments, the first transmission module is further configured to transmit the adjusted uplink transmission period configuration of the Uu data.

In some embodiments, priorities of different types of sidelink data are different.

Figure 9:
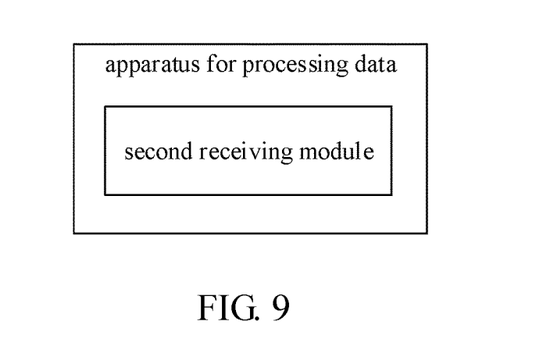
FIG. 9 is a block diagram illustrating another apparatus for processing data according to embodiments of the disclosure.

As illustrated in FIG. 9, an apparatus for processing data is provided in the embodiment and includes a second receiving module.

The second receiving module is configured to receive a priority of a Uu logic channel for Uu data, in which the priority of the Uu logic channel for Uu data and a priority of sidelink data are jointly configured to, in response to a transmission conflict between the Uu data and the sidelink data, select data with a higher priority from the Uu data and the sidelink data for preferential transmission; and there are at least two priorities for the sidelink data.

In some embodiments, the second receiving module may be a program module, and the program module may implement receiving the priority of thee Uu logic channel when performed by a processor.

In some embodiments, the second receiving module may be a software-hardware combination module, and the software-hardware combination module may include various programmable arrays; the programmable array includes but not limited to a complex programmable array or a field programmable gate array.

In some embodiments, the second receiving module may include a pure hardware module, and the pure hardware module may include various application-specific integrated circuits.

In one embodiment, the apparatus further includes a second transmission module.

The second transmission module is configured to, select the data with the higher priority from the Uu data and the sidelink data for preferential transmission based on the priority of the Uu logic channel for the Uu data and the priority of the sidelink data, in response to the transmission conflict between the Uu data and the sidelink data.

In one embodiment, the apparatus further includes a second transmission module.

The second transmission module is configured to report a transmission period configuration of the sidelink data, in response to an uplink transmission period of the Uu data and a transmission period of the sidelink data, between which the transmission conflict exists, satisfying a predetermined condition, in which, the transmission period configuration of the sidelink data is configured to trigger an adjustment of an uplink transmission period configuration of the Uu data.

In some embodiments, the second transmission module, is further configured to transmit a PQI of the sidelink data while transmitting the transmission period configuration of the sidelink data, in which the PQI of the sidelink data is configured to determine whether to adjust an uplink transmission configuration of the Uu data.

In some embodiments, the second adjusting module is further configured to, report the transmission period of the sidelink data in response to the uplink transmission period of the Uu data and the transmission period of the sidelink data, between which the transmission conflict exists, satisfying the predetermined condition, and in response to the priority of the sidelink data being higher than the priority of the Uu logic channel for the Uu data.

In some embodiments, the second receiving module is further configured to receive the adjusted uplink transmission period configuration of the Uu data.

In one embodiment, the apparatus further includes a second adjusting module.

The second adjusting module is further configured to, adjust the transmission period configuration of the sidelink data in response to the uplink transmission period of the Uu data and the transmission period of the sidelink data, between which the transmission conflict exists, satisfying the predetermined condition, and in response to the priority of the sidelink data being not higher than the priority of the Uu logic channel for the Uu data.

In combination with the above any embodiments, several specific examples are provided:

EXAMPLE 1

In 5G transmission of multiple types of data is supported on sidelink, such as URLLC and eMBB. In response to the transmission conflict between the Uu data and the sidelink data, priorities of the same Uu data for different sidelink data may be different. For this purpose, a method for preferentially selecting for data transmission is provided in the example, which may dynamically adjust the priority ranking of the Uu data and the sidelink data based on priorities of different sidelink data, and then select Uu data or sidelink data with a higher priority for transmission, to satisfy preferential transmission of data with the higher priority (that is, a higher urgency degree).

EXAMPLE 2

The priority of the Uu logic channel may be configured by the base station, and the priority of the Uu logic channel configured by the base station is transmitted to the terminal.

In response to the transmission resource conflict between the sidelink data and the Uu data of the UE, the UE selects the data with the higher priority for transmission by comparing the priority of the Uu logic channel for the Uu data to be transmitted with the priority of the PQI of the sidelink data to be transmitted.

The transmission conflict may not support simultaneous transmission of the Uu and the sidelink due to a limited transmission power, and also may not support simultaneous transmission of the Uu and the sidelink due to the UE ability.

In response to the conflict on the position of the periodic Uu uplink resource, and the uplink transmission period of the Uu data being consistent with the transmission period of the sidelink data, the UE may report the resource conflict condition to the base station.

The reported conflict information may include at least one of a PQI of a periodic sidelink service, a start subframe, a subframe duration and a period of an uplink transmission resource.

EXAMPLE 3

The priorities configured by the base station for Uu logic channels 1, 2, 3 of the UE are respectively 1, 3, 6.

At the same time, the priorities of PQIs of two sidelink services for the UE are respectively 2, 4.

In response to the transmission resource conflict between the Uu and the sidelink, there is data to be transmitted in the Uu logic channel 2, and the priority of the PQI of the sidelink data to be transmitted is 4. In this case, the UE selects the sidelink transmission resource to transmit the sidelink data with the priority of 4 for the PQI.

EXAMPLE 4

The priorities configured by the base station for Uu logic channels 1, 2, 3 of the UE are respectively 1, 3, 6.

At the same time, the priorities of PQIs of two sidelink services for the UE are respectively 2, 4.

Two periodic uplink transmission period configurations configured by the base station for the UE are illustrated in Table 1.

In response to the transmission conflict between the Uu data and the sidelink data at a subframe 5, there is data to be transmitted in the Uu logic channel 2, and the priority of the PQI of the sidelink data to be transmitted is 4. In this case, the UE selects the sidelink transmission resource to transmit the sidelink data with the priority of 4 for the PQI.

The UE finds that the sidelink data period with the priority of 4 for the PQI is 20 ms, which is consistent with the Uu periodic uplink transmission resource. In this case, the UE may transmit conflict information of the PQI, 4, the period 20 ms, the start subframe 5 and a duration 1ms to the base station.

The communication device provided in embodiments includes a transceiver, a memory and a processor. The transceiver may interact with other devices. The transceiver includes but is not limit to a tranceiving antenna. The memory stores with computer executable instructions. The processor is connected to the transceiver and the memory, which may perform the method for processing data in any above technical solution.

Figure 10:
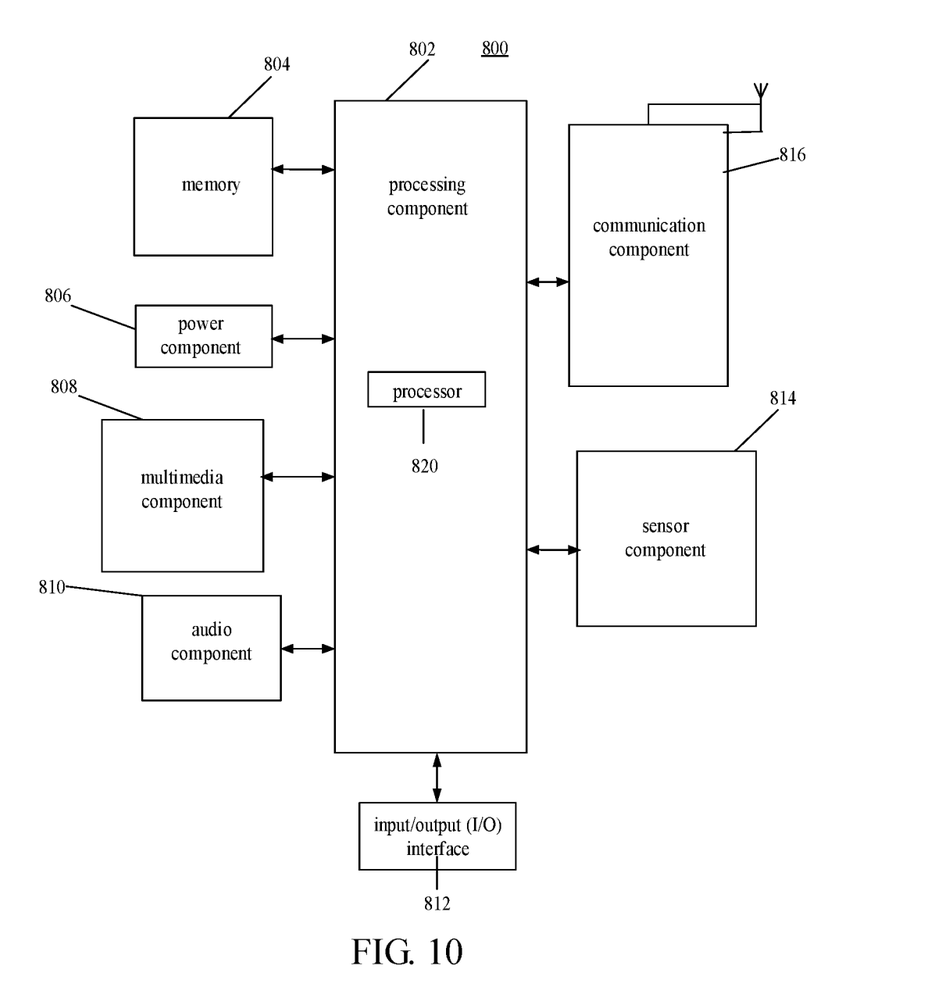
FIG. 10 is a block diagram illustrating a terminal according to embodiments of the disclosure.

FIG. 10 illustrates a terminal according to an embodiment. The terminal may be a mobile phone, a computer, a digital broadcast terminal, a messaging device, a gaming console, a tablet, a medical device, an exercise equipment, a personal digital assistant, and the like.

As illustrated in FIG. 10, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like.

The buttons may include, but not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as Wi-Fi, 2G, or 3G, or a combination thereof In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Figure 11:
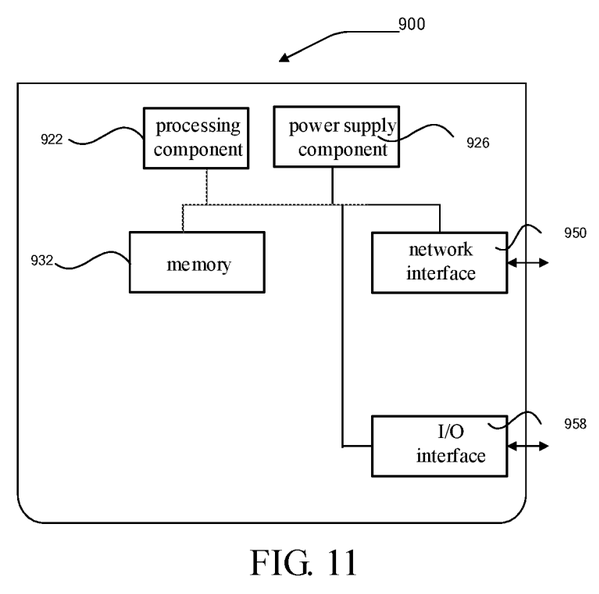
FIG. 11 is a block diagram illustrating a base station according to embodiments of the disclosure.

FIG. 11 is a diagram illustrating a base station. Referring to FIG. 11, the device 900 includes a processing component 922 further including one or more processors, and memory resources represented by the memory 932 configured to store instructions performed by the processing component 922, for example, application programs. The application programs stored in the memory 932 may include one or more modules, each of which corresponds to a set of instructions. In addition, the processing component 922 is configured as executive instructions, to perform a method for monitoring a PDCCH as illustrated in FIG. 4 and/or FIG. 5.

The device 900 may further include one power supply component 926 configured to perform power management of the device 900, and one wired or wireless network interface 950 configured to connect the device 900 to a network, and one input/output(I/O) interface 958. The device 900 may operate an operating system stored in the memory 932, for example, Windows Server™, Mac OS X™, Unix™, Linux™, FreeBSD™ or the like.

Other embodiments of the disclosure will be apparent to those skilled in the art from consideration of the specification and practice of the disclosure disclosed herein. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for processing data, performed by a base station, comprising:

transmitting a priority of a Uu logic channel for Uu data to a terminal, wherein, the priority of the Uu logic channel for the Uu data and a priority of sidelink data are jointly configured to, in response to a transmission conflict between the Uu data and the sidelink data, select data with a higher priority from the Uu data and the sidelink data for preferential transmission, wherein the priority of the Uu logic channel is compared with the priority of the sidelink data; wherein, there are at least two priorities for the sidelink data;

receiving a transmission period configuration of the sidelink data, wherein, the transmission period configuration of the sidelink data is reported in response to the transmission conflict between the Uu data and the sidelink data and in response to an uplink transmission period of the Uu data and a transmission period of the sidelink data satisfying a predetermined condition; and adjusting an uplink transmission period configuration of the Uu data based on the transmission period configuration of the sidelink data.

2. The method as claimed in claim 1, wherein, the priority of the sidelink data comprises: a priority of a proximity service quality indication (PQI) of the sidelink data.

3. The method as claimed in claim 1, wherein, the transmission conflict further comprises:

a time-frequency resource conflict of simultaneously transmitting the Uu data and the sidelink data.

4. The method as claimed in claim 1, wherein, adjusting the uplink transmission period configuration of the Uu data based on the transmission period configuration of the sidelink data, comprises:

adjusting the uplink transmission period configuration of the Uu data based on the transmission period configuration of the sidelink data in response to the priority of the sidelink data being higher than the priority of the Uu logic channel for the Uu data.

5. The method as claimed in claim 1, wherein, the priority of the sidelink data comprises: a priority of a proximity service quality indication (PQI) of the sidelink data;

the method further comprising:

receiving the PQI of the sidelink data while receiving the transmission period configuration of the sidelink data, wherein, the PQI of the sidelink data is configured to determine whether to adjust an uplink transmission configuration of the Uu data.

6. The method as claimed in claim 1, wherein, adjusting the uplink transmission period configuration of the Uu data based on the transmission period configuration of the sidelink data, comprises:
adjusting, based on the transmission period configuration of the sidelink data, at least one of the following in the uplink transmission period configuration of the Uu data:
a start subframe position of the uplink transmission period of the Uu data;
a subframe duration of a subframe contained in the uplink transmission period of the Uu data; and
a period duration of the uplink transmission period of the Uu data.

7. The method as claimed in claim 1, further comprising:
transmitting the adjusted uplink transmission period configuration of the Uu data.

8. The method as claimed in claim 1, wherein, priorities of different types of sidelink data are different.

9. A method for processing data, performed by a terminal, comprising:
receiving a priority of a Uu logic channel for Uu data from a base station, wherein, the priority of the Uu logic channel for the Uu data and a priority of sidelink data are jointly configured to, in response to a transmission conflict between the Uu data and the sidelink data, select data with a higher priority from the Uu data and the sidelink data for preferential transmission, wherein the priority of the Uu logic channel is compared with the priority of the sidelink data; wherein, there are at least two priorities for the sidelink data;
reporting a transmission period configuration of the sidelink data, in response to an uplink transmission period of the Uu data and a transmission period of the sidelink data, between which the transmission conflict exists, satisfying a predetermined condition, wherein, the transmission period configuration of the sidelink data is configured to trigger an adjustment of an uplink transmission period configuration of the Uu data.

10. The method as claimed in claim 9, further comprising:
selecting the data with the higher priority from the Uu data and the sidelink data for preferential transmission based on the priority of the Uu logic channel for the Uu data and the priority of the sidelink data, in response to the transmission conflict between the Uu data and the sidelink data.

11. The method as claimed in claim 9, further comprising:
transmitting a proximity service quality indication (PQI) of the sidelink data while transmitting the transmission period configuration of the sidelink data, wherein, the PQI of the sidelink data is configured to determine whether to adjust an uplink transmission configuration of the Uu data.

12. The method as claimed in claim 9, wherein, reporting the transmission period configuration of the sidelink data, in response to the uplink transmission period of the Uu data and the transmission period of the sidelink data, between which the transmission conflict exists, satisfying the predetermined condition, comprises:
reporting a transmission period of the sidelink data in response to the uplink transmission period of the Uu data and the transmission period of the sidelink data, between which the transmission conflict exists, satisfying the predetermined condition, and in response to the priority of the sidelink data being higher than the priority of the Uu logic channel for the Uu data.

13. The method as claimed in claim 9, further comprising:
receiving the adjusted uplink transmission period configuration of the Uu data.

14. The method as claimed in claim 9, further comprising:
adjusting the transmission period configuration of the sidelink data in response to the uplink transmission period of the Uu data and the transmission period of the sidelink data, between which the transmission conflict exists, satisfying the predetermined condition, and in response to the priority of the sidelink data being not higher than the priority of the Uu logic channel for the Uu data.

15. A base station, comprising:
a transceiver;
a memory; and
a processor, connected to the transceiver and the memory, configured to:
transmit a priority of a Uu logic channel for Uu data to a terminal, wherein, the priority of the Uu logic channel for the Uu data and a priority of sidelink data are jointly configured to, in response to a transmission conflict between the Uu data and the sidelink data, select data with a higher priority from the Uu data and the sidelink data for preferential transmission, wherein the priority of the Uu logic channel is compared with the priority of the sidelink data; wherein, there are at least two priorities for the sidelink data;
receive a transmission period configuration of the sidelink data, wherein, the transmission period configuration of the sidelink data is reported in response to the transmission conflict between the Uu data and the sidelink data and in response to an uplink transmission period of the Uu data and a transmission period of the sidelink data satisfying a predetermined condition; and
adjust an uplink transmission period configuration of the Uu data based on the transmission period configuration of the sidelink data.

16. A non-transitory computer storage medium stored with computer executable instructions, wherein the computer executable instruction is performed by a processor of a base station to perform the method as claimed in claim 1.

17. A terminal, comprising:
a transceiver;
a memory; and
a processor, connected to the transceiver and the memory, configured to control the transceiver to transmit and receive wireless signals by performing computer executable instructions stored on the memory, and perform the method as claimed in claim 9.

18. A non-transitory computer storage medium stored with computer executable instructions, wherein the computer executable instruction is performed by a processor of a terminal to perform the method as claimed in claim 9.

19. The method as claimed in claim 1, wherein, the transmission conflict further comprises:
a transmission power conflict of simultaneously transmitting the Uu data and the sidelink data.

* * * * *